US006585776B1

United States Patent
Bates et al.

(10) Patent No.: US 6,585,776 B1
(45) Date of Patent: *Jul. 1, 2003

(54) COMPUTER SYSTEM AND METHOD OF DISPLAYING HYPERTEXT DOCUMENTS WITH INTERNAL HYPERTEXT LINK DEFINITIONS

(75) Inventors: Cary L. Bates, Rochester, MN (US); Paul R. Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,080

(22) Filed: Nov. 10, 1999

Related U.S. Application Data

(62) Division of application No. 08/925,565, filed on Sep. 8, 1997, now Pat. No. 5,987,482.

(51) Int. Cl.[7] .............................................. G06F 15/00
(52) U.S. Cl. ..................... 715/501.1; 715/513; 715/514
(58) Field of Search ............................. 707/501.1, 513, 707/514; 345/473, 786, 787; 715/501.1, 513, 514

(56) References Cited

U.S. PATENT DOCUMENTS

| | | | | |
|---|---|---|---|---|
| 5,506,951 A | * | 4/1996 | Ishikawa ..................... 345/786 |
| 5,708,825 A | | 1/1998 | Sotomayor ................... 707/501 |
| 5,745,360 A | | 4/1998 | Leone et al. ................. 364/140 |
| 5,802,299 A | | 9/1998 | Logan et al. ................. 707/513 |
| 5,806,077 A | | 9/1998 | Wecker ....................... 707/501 |
| 5,845,299 A | | 12/1998 | Arora et al. .................. 707/513 |
| 5,870,552 A | | 2/1999 | Dozier et al. ................ 707/501 |
| 5,903,267 A | * | 5/1999 | Fisher ......................... 345/341 |
| 5,908,467 A | | 6/1999 | Barrett et al. ................ 709/218 |
| 5,913,065 A | | 6/1999 | Faustini ....................... 395/703 |
| 5,924,104 A | * | 7/1999 | Earl ........................... 707/501.1 |
| 5,977,972 A | * | 11/1999 | Bates et al. .................. 345/341 |
| 5,978,818 A | * | 11/1999 | Lin ............................ 707/501.1 |
| 5,987,482 A | * | 11/1999 | Bates et al. .................. 707/513 |
| 6,035,330 A | * | 3/2000 | Astiz et al. .................. 709/218 |
| 6,157,381 A | * | 12/2000 | Bates et al. .................. 345/341 |
| 6,178,430 B1 | * | 1/2001 | Cohen et al. ................ 707/501.1 |
| 6,204,845 B1 | * | 3/2001 | Bates et al. .................. 345/339 |
| 6,344,851 B1 | * | 2/2002 | Roberts et al. .............. 345/418 |

OTHER PUBLICATIONS

Lemay, Teach Yourself Web Publishing with HTML 3.0 in a Week, Sams.net Publishing, 1996, pp. 89–90.*
Solway, VIEWHTML 2.5, Google, 1997, pp. 1–4.*
PCUGR Handbook, "Welcome to PCUGR!", Google 11/00, pp. 1–2.*

(List continued on next page.)

*Primary Examiner*—Heather R. Herndon
*Assistant Examiner*—Cong-Lac Huynh
(74) *Attorney, Agent, or Firm*—Wood, Herron & Evans, LLP

(57) ABSTRACT

A computer system and method display internal and external hypertext link definitions in different representations to simplify a user's recognition of the external/internal status of each hypertext link definition in a document. Additional information, such as the direction from an internal hypertext link definition to the location in the document pointed to by that definition, and/or the absolute or relative position of the location pointed to by an internal hypertext link definition, may also be displayed. Moreover, a computer system and method may also display the position of the location pointed to by an internal hypertext link definition on a scroll bar such that location information about a particular document is centralized within a common user interface component.

67 Claims, 7 Drawing Sheets

OTHER PUBLICATIONS

Solway, Solway's Software Page, 11/02, screenshots #1–#4.*

Kaiser et al., An Architecture for WWW–based Hypercode Environments, ACM 1997, pp. 3–13.*

Bergmann et al., Course Description & Syllabus, Sep. 1, 1996, Google search, pp. 1–4.*

Bergmann et al., Lab 6, Google Search, pp. 1–4, Oct. 17, 1996.*

Saylor et al., How to Publish Information on a World Wide Web Server: HTML Authoring Using BB Edit Lite and HTML Editor, Google Search, pp. 1–6, Nov. 18, 1996.*

Powell, Engineering 470, Google Search, pp. 1–6, Apr. 12, 1996.*

"Netscape Navigator Handbook", Netscape Communications Corporation, 1996, URL http://www.netscape.com/eng/mozilla/3.0/handbook.

Theng et al., "Designer tools for hypertext authoring", *IEE Colloquium on Authoring and Application of Hypermedia–Based User–Interfaces*, 1995, pp. 4/1–4/4.

Wan et al., "GHMI: a general hypertext data model supporting integration of hypertext and information systems", *Proceedings of the Twenty–Ninth Hawaii International Conference on System Sciences*, 1996, vol. 2, pp. 47–56, ISBN: 08–8186–7426–1.

"HTML and URLs", http://www.w3.org/TR/WD–html40/htmlweb.html, downloaded Aug. 1, 1997.

"Links in HTML Documents", http://www.w3.org/TR/WD–html40/struct/links.html, downloaded Aug. 1, 1997.

Lemay, Laura, "teach yourself Web Publishing with HTML 3.2 in a week", Sams.net Publishing, 1996, ISBN 1–57521, pp. 77–106.

* cited by examiner

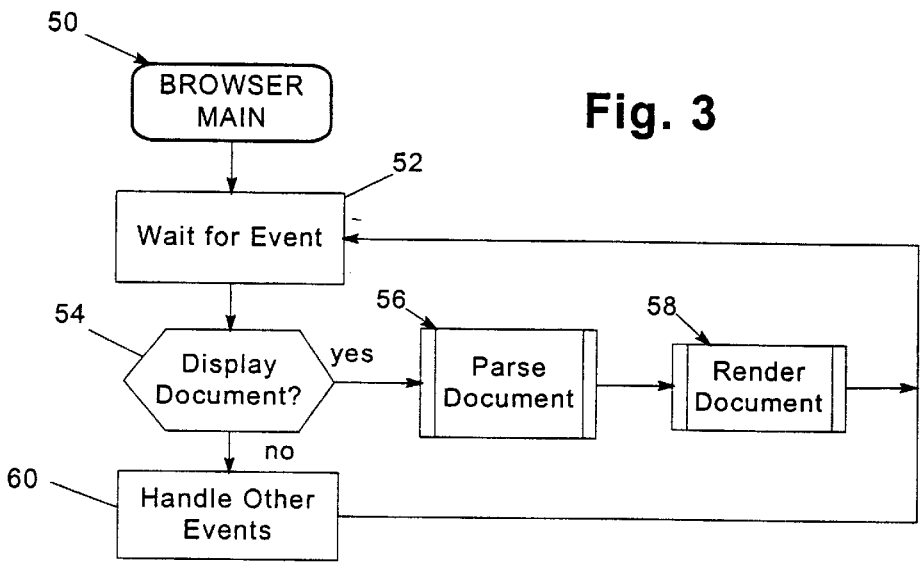
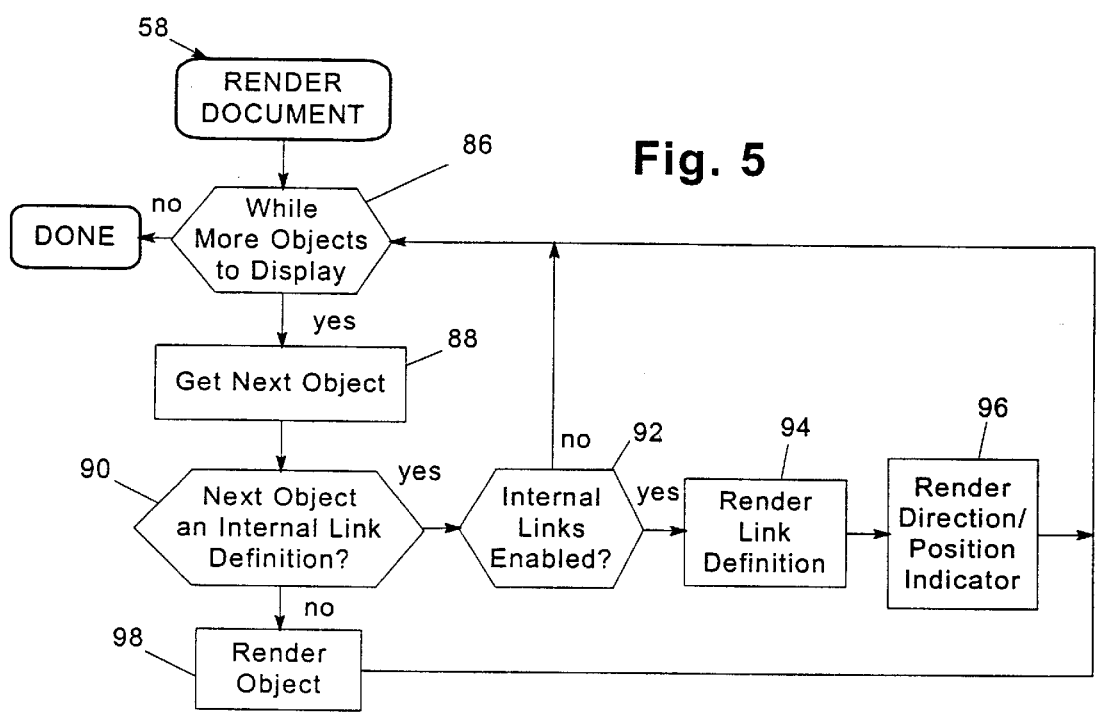

COMPUTER SYSTEM AND METHOD OF DISPLAYING HYPERTEXT DOCUMENTS WITH INTERNAL HYPERTEXT LINK DEFINITIONS

This application is a divisional of U.S. patent application Ser. No. 08/925,565, filed on Sep. 8, 1997 now U.S. Pat. No. 5,987,482 by Cary L. Bates et al., which application is incorporated by reference herein.

FIELD OF THE INVENTION

The invention is generally related to computers and computer software. More specifically, the invention is generally related to a manner of displaying hypertext documents on a computer display.

BACKGROUND OF THE INVENTION

Hypertext linking has radically simplified the manner in which users interact with computers. With hypertext linking, links are defined between a source location in one document and a target location in the same or another document. A user navigates from the source to the target typically by selecting a hypertext link definition at the source location. In addition, a hypertext link definition can be associated with a particular object displayed in a document so that the associated object may be selected by a user to activate a hypertext link.

By associating hypertext link definitions with displayed objects, an extremely powerful, efficient, and intuitive interface is provided to a user. As an example, a document may include hypertext links between selected words and their definitions. A user reading that document may then be able to pull up definitions of particular words that he or she does not understand by merely selecting those words directly. In a typical graphical or windows-type computer system, selection may be performed quickly and easily by moving a pointer over a specific word using a mouse and then clicking a button on the mouse—a concept known as "clicking on" an object.

Hypertext link definitions may be associated with a wide variety of display objects such as text, images, sounds, animation, and video clips, among others. One segment of the Internet, the World Wide Web, relies extensively on hypertext linking to permit users to navigate between documents that contain a wide variety of such multimedia objects. Documents are formatted using a standard language known as the Hypertext Markup Language (HTML).

Users typically view documents from the World Wide Web using a computer software application (known as a browser) that is configured to read this specific document format. A browser typically incorporates at least one graphical window that displays all or a portion of a particular document. The window may also include a scroll bar that a user manipulates to scroll through different portions of a displayed document.

It is in large part the simplicity and intuitiveness of hypertext linking that has made the World Wide Web the most popular segment of the Internet for many users. In addition, hypertext linking has enjoyed such popularity on the Internet that many private computer networks are set up as intranets that use the same hypertext linking concepts to organize and permit access to information stored on a company's network. Hypertext linking concepts are also used with many help systems, and have even been incorporated into the basic user interface mechanisms of some operating systems.

Many conventional browsers highlight text-based hypertext link definitions using different formatting for the word or words associated with each definition. As an example, a hypertext link definition may be highlighted through underlining and/or by portraying the text in a different color than the surrounding text. Different colors may also be used with hypertext link definitions to distinguish between those that point to previously-viewed documents and those that point to new documents, so that a user is less likely to inadvertently take a link to a document that he or she has already visited.

Hypertext link definitions may be categorized into external and internal hypertext link definitions. An external hypertext link definition links together two different documents, while an internal hypertext link definition links together two different locations within the same document. With conventional browsers, however, most users are unable to readily distinguish between external and internal links without actually taking the individual hypertext link definitions.

It is often frustrating for many users when they discover that a particular hypertext link that they have taken leaves them at a different location within the same document—and often at a location that they have already viewed. Moreover, other users may realize that they have taken an internal hypertext link to a previously-viewed location in a document only after they have read some of the information at the new location. Conversely, other users may desire to stay within a particular document and avoid taking external hypertext links, since navigation to external links is often slower than to internal links. Navigating between hypertext links therefore can become a tedious and time consuming trial and error process.

It is often desirable to maximize the time a user is viewing documents while minimizing the time a user is navigating hypertext links. This desire is even more prominent when the effects of network congestion (which can slow retrieval of new documents as well as of updates to existing documents) are considered. Avoiding navigation to undesired hypertext links would therefore eliminate a significant source of user frustration and lost productivity.

More sophisticated users having a detailed knowledge of HTML may be able to determine whether a link definition is for an internal or external link by referring to the location of the target of the link definition that is displayed in a pop-up window or status bar of some browsers when a mouse pointer is positioned over the link definition. A Uniform Resource Locator (URL) address is often displayed for documents from the World Wide Web, and filename and directory information is typically displayed for documents stored on a private network or a user's local computer. For the casual user, however, the information displayed about a target location is often meaningless.

Therefore, a significant need continues to exist for a manner of improving the efficiency of hypertext linking, particularly through minimizing the navigation of undesired hypertext links.

SUMMARY OF THE INVENTION

The invention addresses these and other problems associated with the prior art in providing in one aspect a computer system and method in which internal and external hypertext link definitions are displayed in different representations to simplify a user's recognition of the external/internal status of each hypertext link definition in a document. Consistent with another aspect of the invention, additional information regarding internal hypertext link definitions may also be provided to a user. For example, in one aspect a user may be informed of the direction from an internal hypertext link definition to the location in the document pointed to by that definition. In another aspect, a user may be informed of the position in the document, whether absolute or relative, of the location pointed to by an internal hypertext link definition.

Using any or all of the information supplied to a user about the hypertext link definitions in a document, a user can often make a more informed decision as to whether it would be productive to take any given link in the document. As a result, the number of unproductive links that are taken may be minimized, often making browsing a more enjoyable and productive task.

Consistent with another aspect of the invention, a computer system and method may also be provided for displaying in a window a hypertext document with an internal hypertext link definition, with the position of the location pointed to by the internal hypertext link definition indicated on a scroll bar displayed in the window. Given that one principal use of a scroll bar is in indicating where a user is located in a given document displayed in a window, the additional functionality imparted to a scroll bar consistent with the invention efficiently centralizes location information about a particular document within a common user interface component.

These and other advantages and features, which characterize the invention, are set forth in the claims annexed hereto and forming a further part hereof However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 3 is a flowchart illustrating the program flow for the main routine of a browser consistent with the invention.

FIG. 5 is a flowchart illustrating the program flow for the rendered document routine of FIG. 3.

DETAILED DESCRIPTION

The embodiments of the invention described hereinafter visually distinguish between internal and external hypertext link definitions, as well as optionally provide direction and/or position information for the same. The embodiments discussed hereinafter may find applicability, for example, with hypertext documents in an HTML format, e.g., as used on the World Wide Web (among other applications). However, it should be appreciated that other hypertext document formats may be used in the alternative.

In general, a hypertext document may include any collection of information whether stored in one or more specific files on a computer, in one or more records in a database, etc. Hypertext documents typically include text, but may also include various multimedia objects such as images, sound, animation, video clips, etc.

A hypertext link definition is typically rendered in a hypertext document and may be selected by a user to invoke a link defined in the hypertext link definition. An external hypertext link typically includes the location of a target, typically including a uniform resource locator (URL) having a different resource than the current document. An external hypertext link may also include a specific location in another document when an anchor reference is appended to the URL.

An internal hypertext link typically includes a fragment URL that refers to an anchor within the same document as the definition. The anchor is typically designated by a "#" followed by an anchor token. An internal hypertext link definition points to the same resource as the current document, although this resource information may or may not be included in the URL specified in the definition.

Hardware Environment

Figure 1:
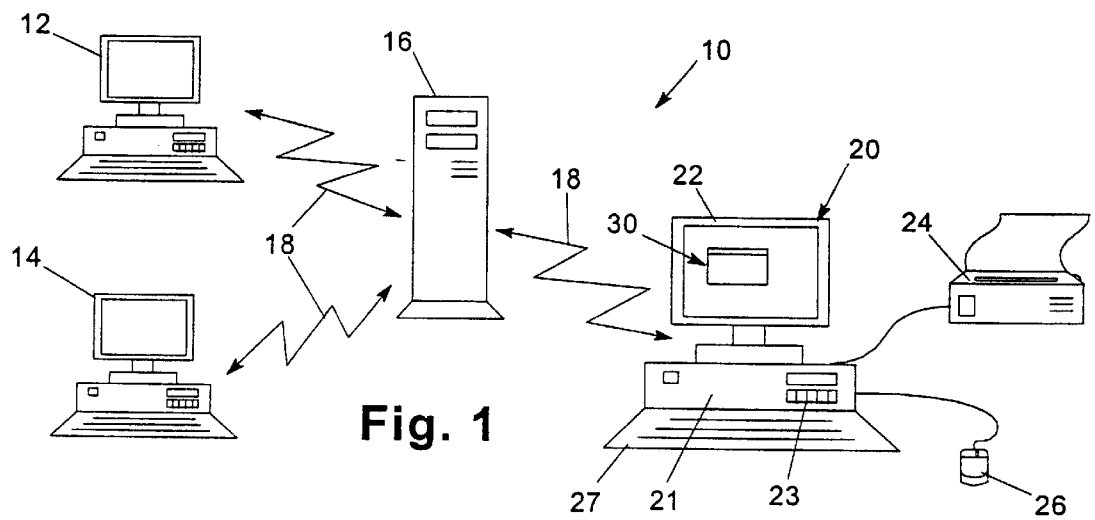
FIG. 1 is a block diagram of a computer system consistent with the invention.

Turning to the Drawing, wherein like numbers denote like parts throughout the several views, a computer system 10 consistent with the invention is illustrated in FIG. 1. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include a processor such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. For example, one such computer software application is a hypertext browser 30, a window of which is displayed on computer display 22. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, DVD's, and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Environment

Figure 2:
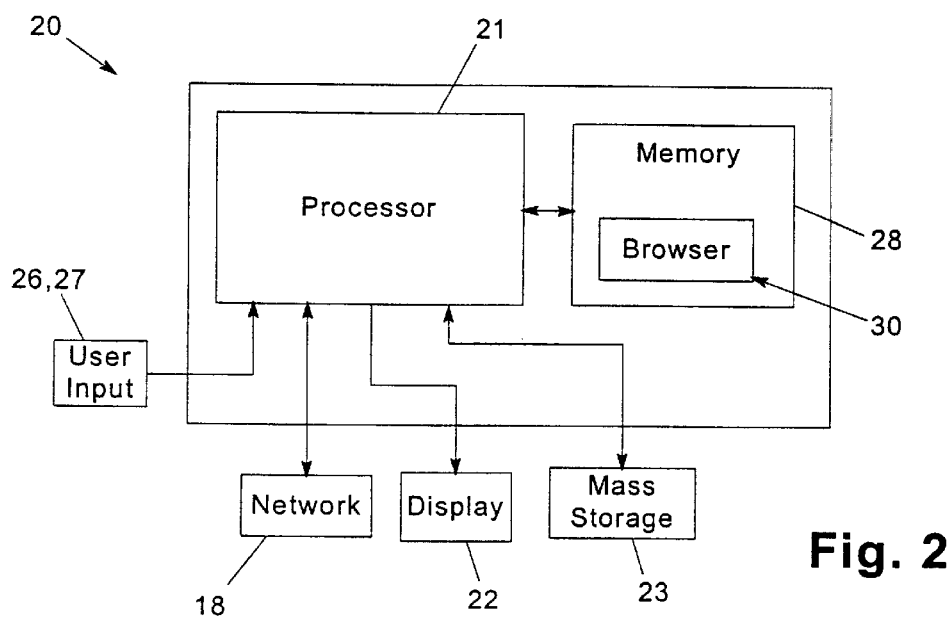
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A browser 30 is illustrated as resident in memory 28. However, it should be appreciated that browser 30 may be stored on network 18 or mass storage 23 prior to start-up, and in addition, may have various components that are resident at different times in any of memory 28, mass storage 23, network 18, or within registers and/or caches in processor 21.

Browser 30 processes hypertext documents for viewing. The hypertext documents may be retrieved from mass storage 23 or over network 18, e.g., through an Internet connection. Moreover, hypertext documents may be cached from time to time in the memory 28 and/or mass storage 23 once they are viewed to accelerate subsequent viewing by a user.

It should be appreciated that other software environments may be utilized in the alternative.

Internal/External Hypertext Link Definition Display

FIG. 3 illustrates an exemplary program flow for a main routine 50 executed by browser 30 of FIG. 2. Routine 50 is shown implemented in an event-driven representation. However, other programming models, e.g., procedural or object-oriented models, may be used in the alternative.

Routine 50 begins in block 52 by waiting for system events, in a manner known in the art. Events which are not relevant to an understanding of the invention are handled in a conventional manner as represented by block 60. For example, events such as scrolling, link selection, window resizing, and other conventional browser events, may be handled in a manner known in the art.

One event which is relevant to the invention, however, is a display document event which is detected at block 54. In response to this event, a parse document routine 56 is executed to generate a data structure with the formatting information for each display object in a hypertext document, and a render document routine 58 is called that utilizes the parse data structure generated by parse document routine 56 to display each display object in the hypertext document on the computer display.

Figure 4:
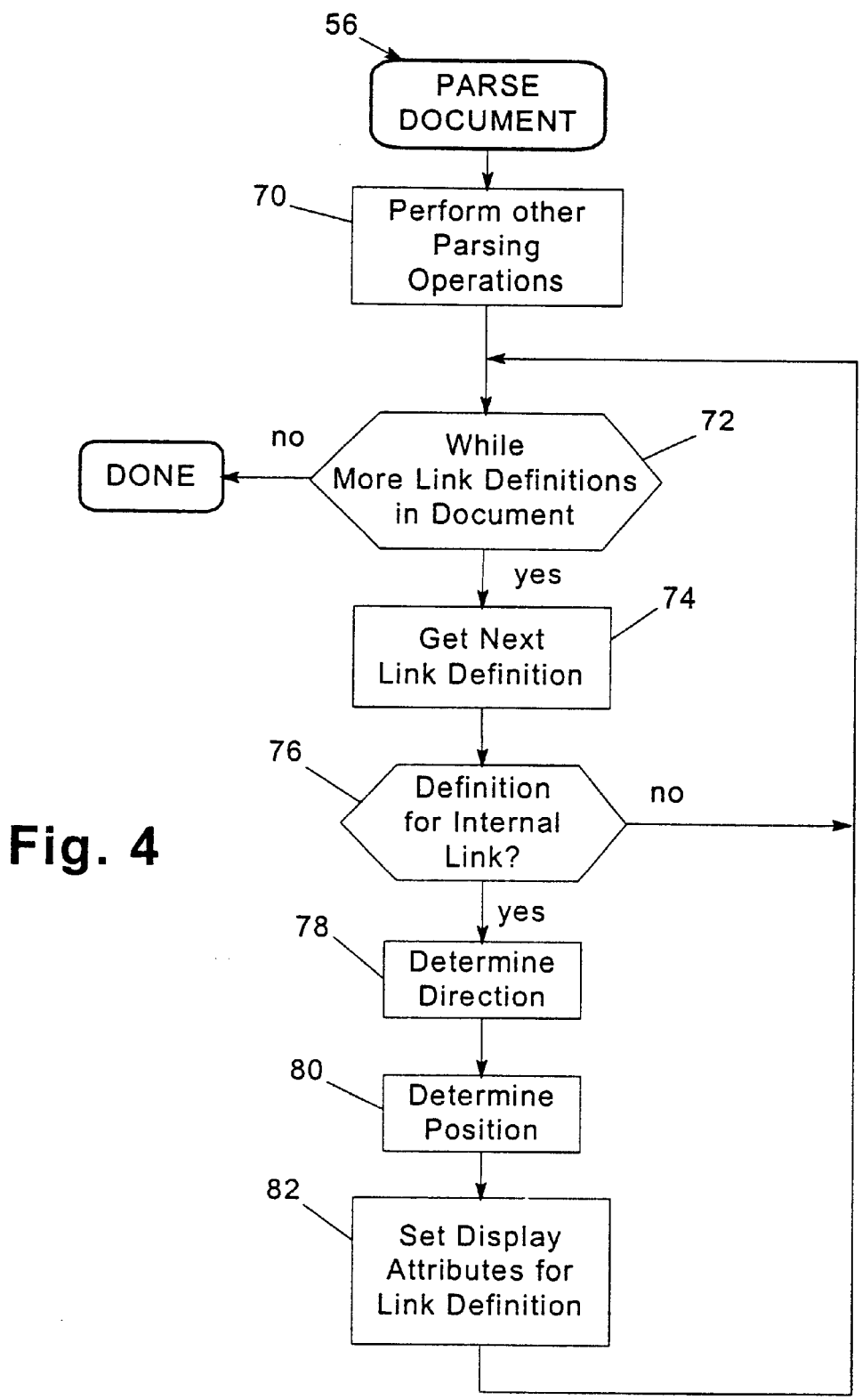
FIG. 4 is a flowchart illustrating the program flow of the parsed document routine of FIG. 3.

Parse document routine 56 is illustrated in greater detail in FIG. 4. As illustrated at block 70, routine 56 typically performs general parsing operations well-known in the art. Upon completion of these operations, a loop is initiated at block 72 to scan for internal hypertext link definitions in a hypertext document. Starting at block 72, a while loop executes until each hypertext link definition in the hypertext document has been scanned. In block 74, the next hypertext link definition in the hypertext document is retrieved. Next, in block 76, the link definition is scanned to determine whether the definition relates to an internal or external link. For example, to determine an internal link, block 76 may look for an anchor reference with a URL having either no resource information or the same resource information as the current document.

If the link definition is determined to be an external link, control passes back to block 72 to retrieve the next link definition. If, however, the link definition is for an internal link, one or both of blocks 78 and 80 are optionally performed to determine specific information relating to the internal hypertext link definition.

Block 78 determines a direction for the internal hypertext link definition by comparing the location of the link definition to that of the target referenced therein. In addition, block 78 may also determine if the target is located at the top or bottom of a document and set an appropriate flag indicating such.

Block 80 determines the relative or absolute position of the target of the link definition by comparing the location of the target to that of the link definition.

Block 80 may determine an absolute position that is representative of the actual location of the target in the document. The absolute position is typically independent of the location of the link definition and may be indicated by various numerical indicators such as line number, column number, byte number and/or x, y coordinates, among others. The absolute position may also be stored as a specific value, or as a percentage of the overall size of the document.

Block 80 may also calculate a relative position of the target relative to the link definition. The relative position may be stored as a specific distance, e.g., in terms of line number, column number, byte number, character number, and/or x, y coordinates, among others. The relative location may also be stored as a percentage of the document size, for example.

As an example, if a document has ten lines with an internal hypertext link definition defined at line three and pointing to a target located at line eight, the absolute position of the target may be stored as a numerical indicator, such as line eight, or a percentage indicator, such as eighty percent (indicating that the target is located eighty percent of the way through the document). A relative position may also be stored as a numerical value such as line five, indicating that the target is five lines away from the internal link definition. In the alternative, the relative position may be stored as a percentage such as fifty percent, indicating that the target is half the document size away from the internal hypertext link definition.

It should be appreciated that the direction and position information may also be combined into the same value. For example, a negative relative position may indicate a backwards direction, with a positive relative position indicating a forward direction.

Once direction and/or position information are optionally determined, block 82 sets the display attributes for the internal hypertext link definition. For example, a flag may be set to indicate the internal status of the definition. In addition, the direction and/or position information may be stored in the display attributes. The display attributes may represent any suitable data structure, e.g., nodes in a parse tree, as is known in the art. Upon completion of block 82, control passes back to block 72 to scan the remaining hypertext link definitions in the hypertext document.

FIG. 5 illustrates render document routine 58 in greater detail. Routine 58 operates in much the same manner as a conventional rendering routine by executing a loop beginning at block 86 that retrieves each of the display objects at block 88 and then renders each display object at block 98. Routine 58, however, adds an additional step at block 90 to detect and specially handle display objects relating to internal hypertext link definitions.

Whenever a display object for an internal hypertext link definition is detected at block 90, control passes to block 92 to optionally determine whether internal links have been enabled. In particular, a user may be given the option of disabling internal links so that the links may not be navigated, or may not even be shown. This may be performed, for example, by setting the display properties for internal links to be that of the surrounding text such that the links are not highlighted to a user. Also, the selection of internal links may be disabled in the link selection handling routines for the browser. In general, this optional functionality may be desired by some users should they never wish to be informed of internal links within documents. However, it should be appreciated that this function may be omitted in the alternative.

If block 92 determines that internal links have been enabled, control is passed to execute either or both of blocks 94 and 96. Block 94 renders a link definition using the representation selected by the user for internal hypertext link definitions. Block 96 displays direction and/or position indicators in conjunction with, or in lieu of, a link definition rendered in block 94. As discussed below, some indicators may indicate various combinations of internal/external status, direction, and/or position. Consequently, it may not be necessary to render separate link definitions, direction indicators and position indicators. For example, just the fact that a direction and/or position indication is provided may be sufficient to indicate the internal/external status of a link without a separate representation. In addition, some position indicators inherently show direction, and therefore separate direction and position indicators may not be required.

Various modifications may be made to the routines disclosed in FIGS. 3–5 consistent with the invention. For example, external hypertext link definitions may also be separately handled, with similar additional information generated for such links. Moreover, the position of the target in a new document may be calculated and utilized in rendering external hypertext link definitions. Other modifications will be apparent to one skilled in the art.

FIGS. 6–12 show various representations of internal hypertext link definitions. It should be appreciated that such representations may be selectable as options by a user, or only one such representation may be available in a given application.

Each of the examples discussed below is based upon the following HTML source code, which generally illustrates a table of contents header at the beginning of a hypertext document for accessing various chapters within the document:

TABLE I

Sample HTML Source Code

```
1  <html>
2  <head>
3  <title>http://Sample.html</title>
4  </head>
5  <a name="Table of Contents"></a>
6  <p><em><strong>Table of Contents</strong></em>
7  <br wp="br1"><br wp="br2">
8  <p> I.       <a href="#Introduction">Introduction</a>
9  <p> II.      <a href="#Chapter 1">Chapter 1</a>
10 <p> III.     <a href="#Chapter 2">Chapter 2</a>
11 <br wp="br1"><br wp="br2"><a name="Introduction"></a>
12 <p><em><strong>Introduction</strong></em>
     o
     o
     o
13 <a name="Chapter 1">
14 <p><em><strong>Chapter 1</strong></em>
     o
     o
     o
15 <a name="Chapter 2">
16 <p><em><strong>Chapter 2</strong></em>
     o
     o
     o
17 <br wp="br1"><br wp="br2">
18 <p>  For More Information, see <a
   href="http://www.ibm.com">http://www.ibm.com</a>
19 <br wp="br1"><br wp="br2">
20 <p>  Click <a href="#Table of Contents">Here</a> to Return to
   Table of Contents
21 </body>
22 </html>
```

Figure 6:
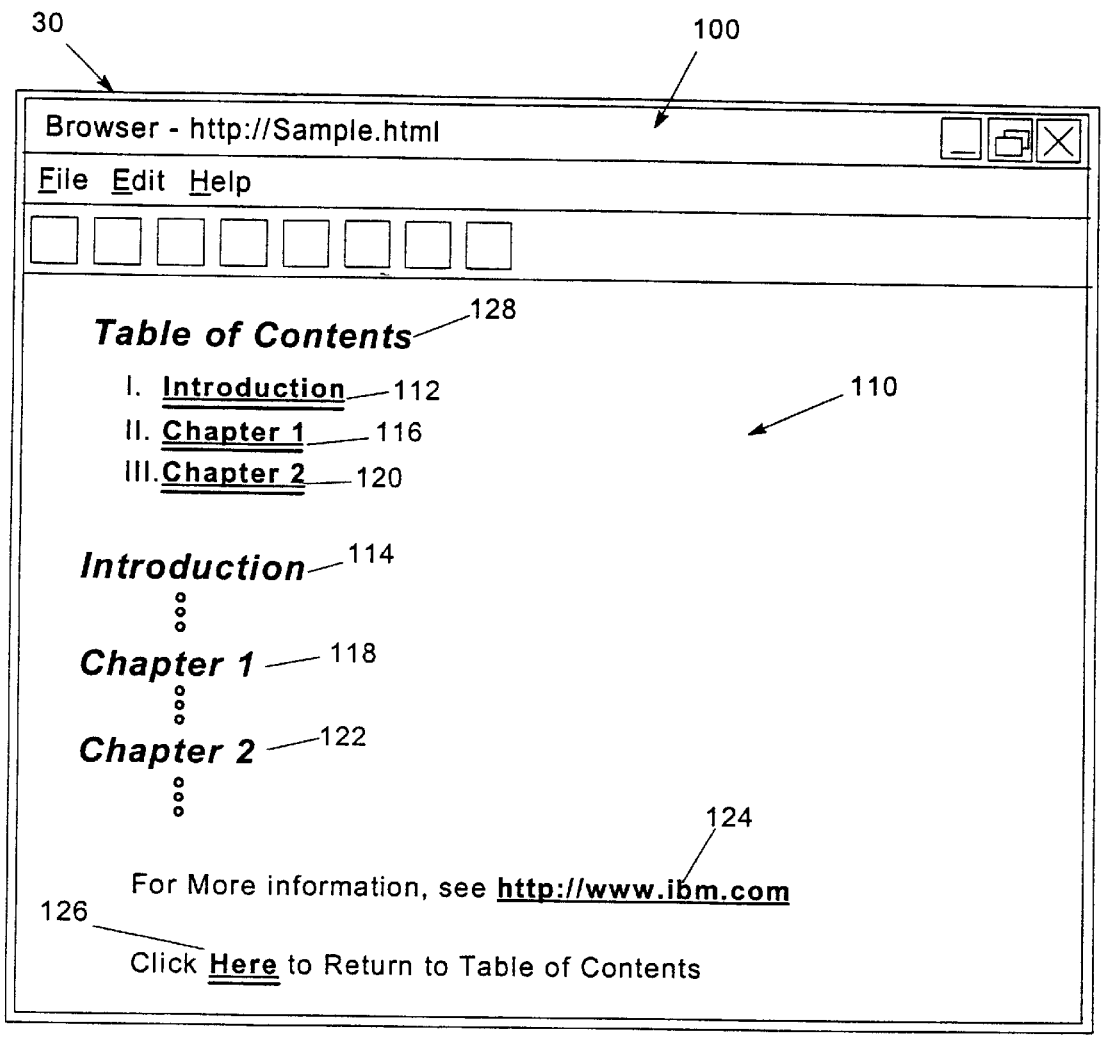
FIG. 6 is a block diagram illustrating a hypertext document displayed in a window on the computer system of FIG. 1, showing one representation of an internal hypertext link definition.

As discussed above, various internal status indications may be used to provide a visually distinct representation of an internal hypertext link definition compared to an external hypertext link definition. As shown in FIG. 6, for example, a window 100 for browser 30 displays hypertext document 110, which is the rendered representation of the source code shown above in Table I. Hypertext document 110 includes an internal definition 112 which points to target 114. In addition, an internal hypertext link definition 116 points to a target 118 and an internal hypertext link definition 120 points to a target 122. Moreover, an internal hypertext link definition 126 points to a target 128 that is disposed at the top of hypertext document 110. Finally, an external hypertext link definition is defined at 124.

As shown in FIG. 6, the internal and external hypertext link definitions may be distinguished by a display characteristic such as the manner in which each definition is formatted. For example, the internal hypertext link definitions 112, 116, 120 and 126 are shown formatted with double underlines, with external hypertext link definition 124 formatted with a single underline. Other formatting or display characteristics may also be used to distinguish internal and external hypertext link definitions. For example, different colors, font faces/sizes, styles (e.g., underline, italics, bold, etc.), and/or other display characteristics may be used. In addition, animation techniques, e.g., blinking, may be used to distinguish one or both of the internal and external hypertext link definitions.

Figure 7:
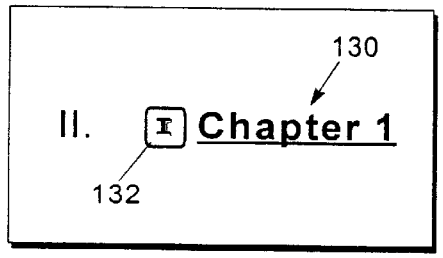
FIG. 7 is a block diagram illustrating an alternate representation of an internal hypertext link definition which uses an icon.

FIG. 7 illustrates an alternate manner of indicating an internal hypertext link definition 130 where a specific icon 132 is appended to the definition to indicate the internal status thereof. Icon 132 is shown with an "I" indication, although other graphical and/or alphanumeric indications may be used in the alternative.

Figure 8:
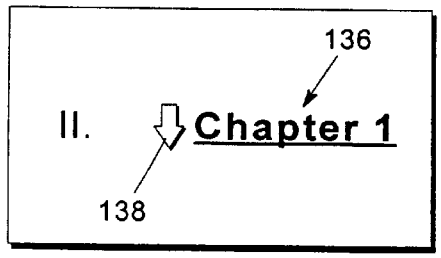
FIG. 8 is a block diagram illustrating an internal hypertext link definition with a direction indicator.

Various manners may also be used to indicate direction information for an internal hypertext link definition. For example, as shown in FIG. 8, an internal hypertext link definition 136 includes a direction indicator 138 displayed as an arrow icon pointing in the direction of the target. It should be appreciated that icon 138 also functions as an internal status indication if no similar icons are used for external links. It should be appreciated that in the alternative various display characteristics such as colors, fonts, etc. may also be used to distinguish the direction of an internal hypertext link.

Figure 9:
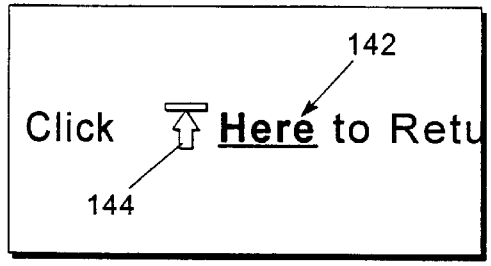
FIG. 9 is a block diagram illustrating an internal hypertext link definition with a top direction indicator.

As shown in FIG. 9, an internal hypertext link definition 142 may also include a top/bottom direction indicator 144 which separately indicates when an internal hypertext link definition points to the top or bottom of the document. Icon 144 may also utilize other representations to indicate the top or bottom of the document, e.g., "T" or "B" icons. In addition, different fonts, colors, etc. may also be used to distinguish top/bottom indicators from standard direction indicators.

Figure 10:
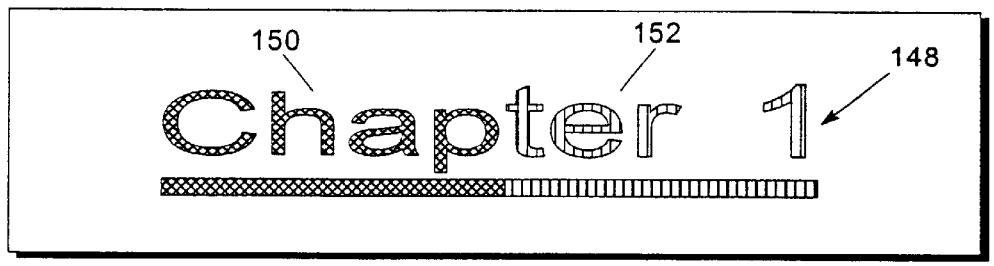
FIG. 10 is a block diagram illustrating an internal hypertext link definition with a position indicator.

Various manners of indicating position may also be used consistent with the invention. For example, FIG. 10 illustrates an internal hypertext link definition 148 that has its text shaded or colored like a bar graph showing the percentage of the document where the target is located. In particular, definition 148 is rendered with different colors 150, 152 that form a boundary therebetween illustrating the absolute position of the target.

Figure 11:
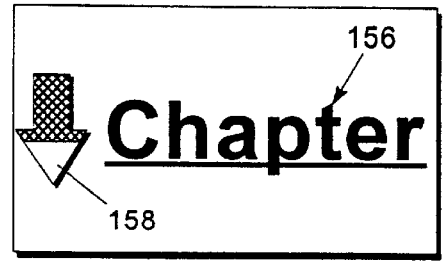
FIG. 11 is a block diagram illustrating an internal hypertext link definition with an integrated direction/position indicator.

In the alternative, as shown in FIG. 11, a combined direction/position indicator 158 may be used to show both position and direction of an internal hypertext link definition 156. As shown in this figure, an arrow 158 is shaded like a vertical bar graph with the absolute position of the target located at the relative location in the document corresponding to the boundary between the two shadings for arrow 158. It should be appreciated that an icon may also be varied in other manners, e.g., varying the size or length of an arrow icon according the relative position of the target.

Figure 12:
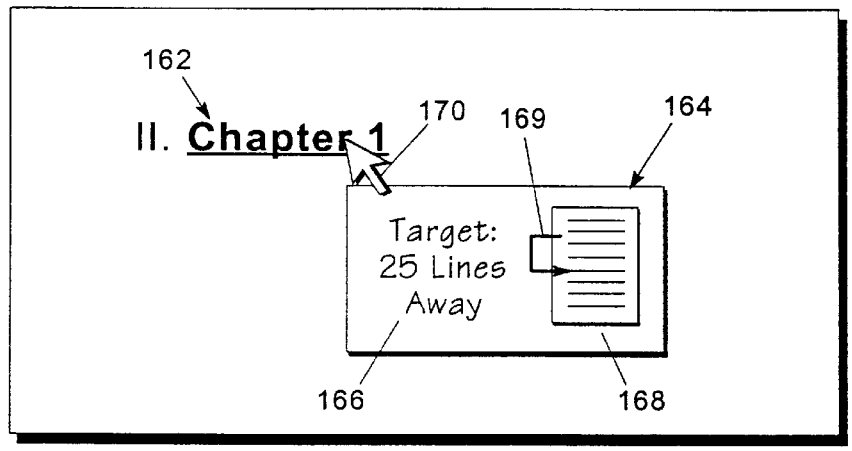
FIG. 12 is a block diagram illustrating an internal hypertext link definition with a pop-up window direction and position indicator.

FIG. 12 illustrates yet another alternative indication of position and/or direction, where an internal hypertext link definition 162 includes a pop-up window 164 that is activated whenever pointer 170 is moved over the definition (i.e., when definition 162 has focus). As shown in this figure, text information 166, e.g., alphanumeric information about the internal/external status, the direction, and/or the relative/absolute position, may be indicated. Moreover, the resource information, such as the URL address, may also be shown. Other information may be indicated consistent with the invention.

This figure also illustrates that graphical information, such as a graphical depiction 168 of the hypertext document, may be included. Depiction 168 also includes an indicator 169 showing the position of the target and/or the link definition in the document. One suitable indicator is that of an arrow which extends from the link definition to the location of the target thereto.

It should be appreciated that pop-up window 164 may be displayed in other containers such as another window or a panel in the current window. For example, a continuous display of a graphical depiction of the document may be shown, with the arrow illustrating the internal hypertext link definition activated only when the internal hypertext link definition has focus.

Various modifications may be made to the above-described embodiments without departing from the spirit and scope of the invention. For example, separate external hypertext link indicators may be used, such as specific colors, icons, etc. A door or arrow icon may be utilized to indicate that a link definition points to a target that is external to the current document. Other modifications will be apparent to one of ordinary skill in the art.

Scroll Bar Indication of Internal Hypertext Link Target Locations

An additional manner of displaying status, direction and/or position information regarding an internal hypertext link definition may be to integrate such information into a scroll bar for the browser window in which a hypertext document is displayed. It should be appreciated that a scroll bar already displays the relative location of the information on the hypertext document that is currently displayed in the window. In addition, it should be appreciated that in some operating systems, the size of the slider used in the scroll bar may be varied to show the relative size of the information that is currently displayed in the window. Accordingly, by providing status, direction and/or position information within a scroll bar, a centralized user interface component may be used to view a wide variety of location information for a document.

Figure 13:
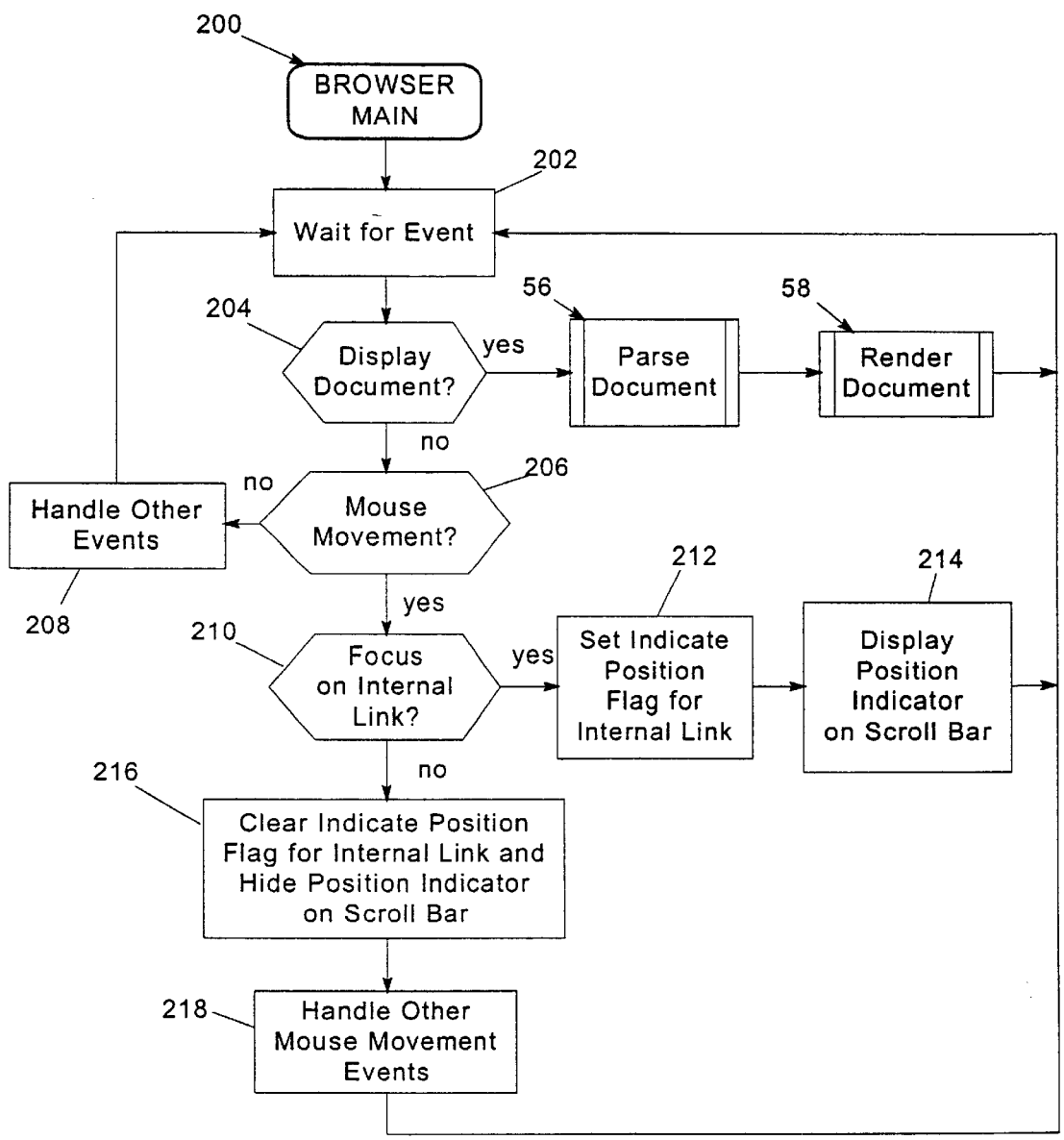
FIG. 13 is a flowchart illustrating the program flow of a main routine for a browser that is alternate to that shown in FIG. 3.

FIG. 13 illustrates an alternate main routine 200 for browser 30 that may be utilized to integrate information into a scroll bar. Block 202 waits for events, and block 204 handles a display document event similar to block 54 of main routine 50 of FIG. 3. Specifically, block 204 may execute parse document routine 56 of FIG. 4 and render document routine 58 of FIG. 5.

Block 206 handles mouse movement events, with any additional events received by browser 30 handled by block 208 in a manner known in the art. If a mouse movement event is detected, block 210 is executed to determine whether focus has been placed on an internal hypertext link definition. If so, block 212 is executed to set an indicate position flag for the internal hypertext link definition, and block 214 is executed to display a position indicator on the window scroll bar. Blocks 212 and 214 may be implemented, for example, in an object-oriented system by creating a subclassed scroll bar control having a position indicator object that can be rendered in conjunction with the rendering of the scroll bar on a window. Such a subclassed object may include a method such as an IndicateTargetPosition( ) method that sets or clears a flag and receives position information for the internal hypertext link definition and/or its target. Such information then may be used during rendering of the scroll bar to determine if and where to render an indicator on the scroll bar indicating information about the internal hypertext link definition. Other manners of implementing an indicator overlapping a scroll bar may be used in the alternative.

Returning to block 210, if focus is not on an internal link, control passes to block 216 to clear the indicate position flag for the internal hypertext link definition, and to hide the position indicator on the scroll bar. Next, in block 218, other mouse movement events received via block 206, e.g., focus being placed on other display objects, are handled in a manner known in the art.

Figure 14:
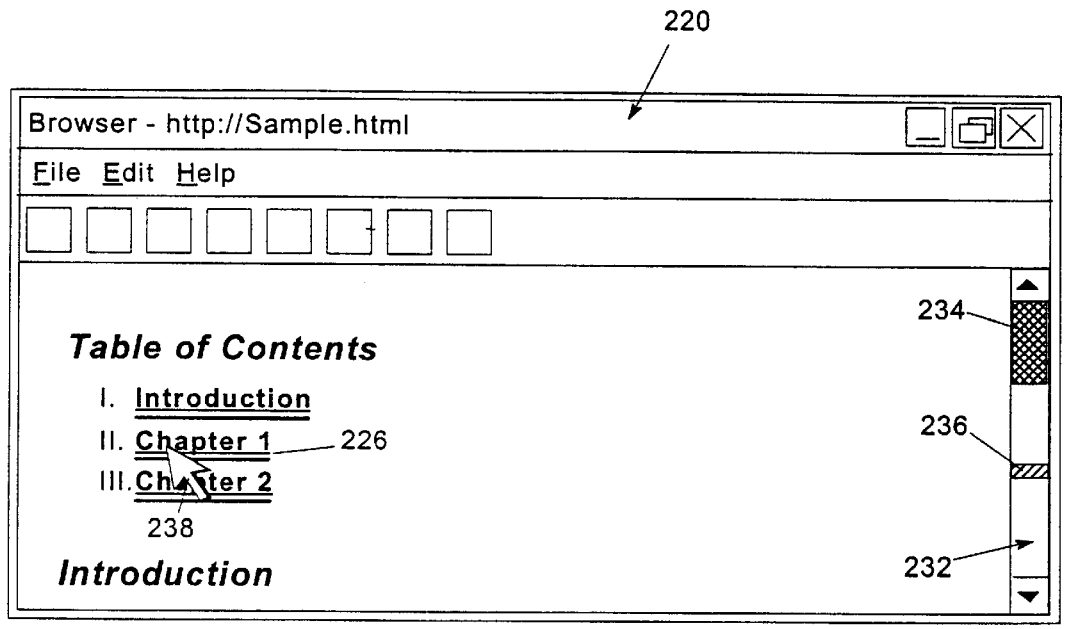
FIG. 14 is a block diagram illustrating a hypertext document displayed in a window with a position indicator provided on a scroll bar.
Figure 15:
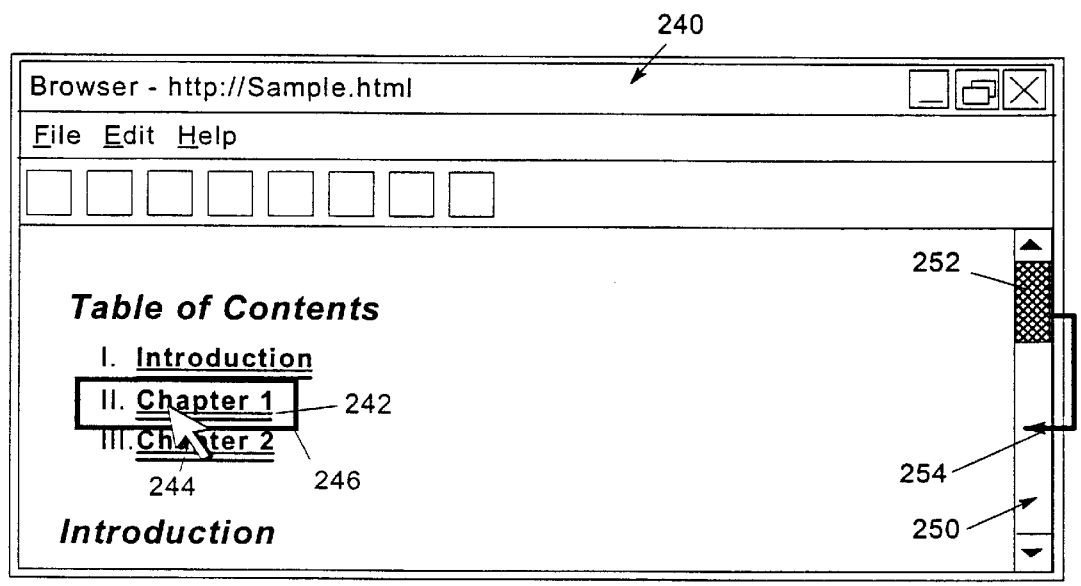
FIG. 15 is a block diagram illustrating a hypertext document displayed in a window with an alternate position indicator displayed on the scroll bar thereof.

FIGS. 14 and 15 illustrate representative indicators which may be displayed on a scroll bar consistent with the invention. For example, as shown in FIG. 14, a window 220 has a scroll bar 232 with a slider 234 disposed thereon. The hypertext document displayed in the window includes an internal hypertext link definition 226 which has a target that is located at the relative position in the document indicated by a position indicator 236 applied to the scroll bar 232. Position indicator 236 is activated only in response to pointer 238 being disposed over internal hypertext link definition 226. Moreover, position indicator 236 is implemented as a horizontal line that extends generally across the width of scroll bar 232. Indicator 236 also acts as a direction indicator by comparing the position of the indicator relative to slider 234.

FIG. 15 illustrates several alternatives to the position indicator of FIG. 14. For example, a window 240 includes a scroll bar 250 having a slider 252 and a position indicator 254 that is associated with an internal hypertext link definition 242. When focus is placed on definition 242 by pointer 244, definition 242 may be highlighted as shown 246. Moreover, position indicator 254 may be activated to show both the absolute position of the internal hypertext link definition (the end without an arrow) and the location of the target for that definition (the end with the arrow). In addition, by virtue of the illustration of the positions of both the definition and its target, the direction of the link is also inherently displayed. Moreover, the activation of the position indicator may also inherently act as an internal status indicator for the link definition.

It should be appreciated that various alternate indicator representations may be used in the alternative. For example, the positions of multiple internal link definition targets may be displayed simultaneously on a scroll bar, typically without requiring the user to focus on a particular link definition. In such applications, it may be desirable to use different colors to coordinate position indicators with particular link definitions. Also, other manners of coordinating position indicators and link definitions, e.g., icons or alphanumeric identifiers, may be used. For example, different geometric shapes, or different letters or numbers, may be appended to link definitions and displayed on the scroll bar to illustrate the position of each link definition target in the document.

Various additional modifications may be made to the above-described embodiments without departing from the spirit and scope of the invention. Therefore, the invention lies solely in the claims hereinafter appended.

What is claimed is:

1. A computer-implemented method of displaying a hypertext document on a computer display, the hypertext document including an internal hypertext link definition located at a first predetermined location in the hypertext document and linked to a second predetermined location therein, the method comprising:
   (a) determining that the internal hypertext link definition is for an internal hypertext link;
   (b) determining at least one of a position of the second predetermined location in the hypertext document and a direction from the first predetermined location to the second predetermined location;
   (c) displaying the internal hypertext link definition on the computer display; and
   (d) in response to determining that the internal hypertext link definition is for an internal hypertext link and determining the at least one of the position and the direction, indicating in association with the internal hypertext link definition the internal status of the internal hypertext link definition to distinguish the internal hypertext link definition from an external hypertext link definition, wherein the internal status further indicates the at least one of the position of the second predetermined location and the direction from the first predetermined location to the second predetermined location.

2. The method of claim 1, wherein the hypertext document is a first hypertext document, the first hypertext document further including an external hypertext link definition linked to a second hypertext document, wherein the method further comprises displaying the external hypertext link definition on the computer display in a first representation, and wherein indicating the internal status of the internal hypertext link definition includes displaying the internal hypertext link definition in a second representation that is visually distinct from the first representation to thereby simplify recognition of an external/internal status of each hypertext link definition.

3. The method of claim 2, further comprising scanning the first hypertext document for internal hypertext link definitions.

4. The method of claim 2, wherein the first and second representations have visually distinct display characteristics selected from the group consisting of colors, fonts, styles, and combinations thereof.

5. The method of claim 2, wherein one of the first and second representations includes an icon.

6. The method of claim 5, wherein the second representation includes the icon, the icon further indicating a direction from the internal hypertext link definition to the predetermined location in the first hypertext document.

7. The method of claim 5, wherein the second representation includes the icon, the icon further indicating a position of the predetermined location in the first hypertext document.

8. The method of claim 2, wherein one of the first and second representations is animated.

9. The method of claim 2, wherein displaying the internal hypertext link definition includes selectively displaying the internal hypertext link definition only in response to user selection of an internal link enable mode.

10. The method of claim 2, further comprising setting the second representation to that of surrounding text in response to user selection of an internal link disable mode.

11. The method of claim 1, wherein the position is a relative position from the internal hypertext link definition to the predetermined location in the hypertext document.

12. The method of claim 1, wherein the position is an absolute position of the predetermined location in the hypertext document.

13. The method of claim 1, further comprising displaying at least a portion of the hypertext document in a window, the window including a scroll bar, wherein indicating the position includes displaying an indicator on the scroll bar.

14. A computer system configured to display a hypertext document, the hypertext document including an internal hypertext link definition located at a first predetermined location in the hypertext document and linked to a second predetermined location in the hypertext document, the computer system comprising:

(a) a computer display; and (b) a processor, coupled to the computer display, the processor configured to display the internal hypertext link definition on the computer display, and, in response to determining that the internal hypertext link definition is for an internal hypertext link and determining at least one of a position of the second predetermined location in the hypertext document and a direction from the first predetermined location to the second predetermined location, to indicate in association with the internal hypertext link definition the internal status of the internal hypertext link definition to distinguish the internal hypertext link definition from an external hypertext link definition, wherein the internal status further indicates the at least one of the position of the second predetermined location and the direction from the first predetermined location to the second predetermined location.

15. The computer system of claim 14, wherein the hypertext document is a first hypertext document further including an external hypertext link definition linked to a second hypertext document, and wherein the processor is further configured to respectively display the external and internal hypertext link definitions in first and second visually distinct representations to thereby simplify recognition of an external/internal status of each hypertext link definition.

16. The computer system of claim 15, wherein the processor is further configured to scan the first hypertext document for internal hypertext link definitions.

17. The computer system of claim 15, wherein the first and second representations have visually distinct display characteristics selected from the group consisting of colors, fonts, styles, and combinations thereof.

18. The computer system of claim 15, wherein one of the first and second representations includes an icon.

19. The computer system of claim 15, wherein one of the first and second representations is animated.

20. A program product, comprising:

(a) a program configured to perform a method of displaying a hypertext document on a computer display, the hypertext document including an internal hypertext link definition located at a first predetermined location in the hypertext document and linked to a second predetermined location in the hypertext document, the method comprising:

(1) displaying the internal hypertext link definition on the computer display; and (2) in response to determining that the internal hypertext link definition is for an internal hypertext link and determining at least one of a position of the second predetermined location in the hypertext document and a direction from the first predetermined location to the second predetermined location, indicating in association with the internal hypertext link definition the internal status of the internal hypertext link definition to distinguish the internal hypertext link.

21. The program product of claim 20, wherein the signal bearing media comprises a recordable type media.

22. The program product of claim 20, wherein the signal bearing media comprises transmission type media.

23. A computer-implemented method of displaying a hypertext document on a computer display, the hypertext document including an internal hypertext link definition located at a first predetermined location in the hypertext document and linked to a second predetermined location in the hypertext document, the method comprising:

(a) determining that the internal hypertext link definition is for an internal hypertext link;

(b) determining a direction from the first predetermined location to the second predetermined location; and (c) displaying the hypertext document on the computer display, including, in response to determining that the internal hypertext link definition is for an internal hypertext link and determining the direction, indicating the direction from the first predetermined location to the second predetermined location on the computer display.

24. The method of claim 23, further comprising displaying the internal hypertext link definition on the computer display, wherein indicating the direction from the first predetermined location to the second predetermined location includes displaying an icon associated with the internal hypertext link definition.

25. The method of claim 24, wherein the icon includes an arrow pointing in the direction of the second predetermined location.

26. The method of claim 23, wherein the second predetermined location is located at one of the top and bottom of the hypertext document, wherein displaying the hypertext document further includes separately indicating that the second predetermined location is disposed at the one of the top and bottom of the hypertext document.

27. The method of claim 23, wherein indicating the direction from the first predetermined location to the second predetermined location includes indicating a position of the second predetermined location in the hypertext document.

28. The method of claim 27, wherein indicating the position of the second predetermined location in the hypertext document is the sole indication of the direction from the first predetermined location to the second predetermined location.

29. The method of claim 23, wherein indicating the direction from the first predetermined location to the second predetermined location includes displaying the internal hypertext link definition on the computer display in one of first and second colors respectively associated with first and second directions.

30. A computer system configured to display a hypertext document, the hypertext document including an internal hypertext link definition located at a first predetermined location in the hypertext document and linked to a second predetermined location in the hypertext document, the computer system comprising:

(a) a computer display; and (b) a processor, coupled to the computer display, the processor configured to display the hypertext document with the internal hypertext link definition; and to indicate on the computer display a direction from the first predetermined location to the second predetermined location in response to determining the direction and determining that the internal hypertext link definition is for an internal hypertext link.

31. The computer system of claim 30, wherein the processor is further configured to display the internal hypertext link definition on the computer display, and to indicate the direction from the first predetermined location to the second predetermined location by displaying an icon associated with the internal hypertext link definition.

32. The computer system of claim 30, wherein the icon includes an arrow pointing in the direction of the second predetermined location.

33. The computer system of claim 30, wherein the second predetermined location is located at one of the top and bottom of the hypertext document, wherein the processor is configured to display the hypertext document by separately indicating that the second predetermined location is disposed at the one of the top and bottom of the hypertext document.

34. The computer system of claim 30, wherein the processor is configured to indicate the direction from the first predetermined location to the second predetermined location by indicating a position of the second predetermined location in the hypertext document.

35. The computer system of claim 34, wherein the indication of the position of the second predetermined location in the hypertext document is the sole indication of the direction from the first predetermined location to the second predetermined location.

36. The computer system of claim 30, wherein the processor is configured to indicate the direction from the first predetermined location to the second predetermined location by displaying the internal hypertext link definition on the computer display in one of first and second colors respectively associated with first and second directions.

37. A program product, comprising:
(a) a program configured to perform a method of displaying a hypertext document on a computer display, the hypertext document including an internal hypertext link definition located at a first predetermined location in the hypertext document and linked to a second predetermined location in the hypertext document, the method comprising:
  (1) determining a direction from the first predetermined location to the second predetermined location; and
  (2) displaying the hypertext document on the computer display, including, in response to determining that the internal hypertext link definition is for an internal hypertext link and determining the direction, indicating the direction from the first predetermined location to the second predetermined location on the computer display, and
(b) a signal bearing media bearing the program.

38. A computer-implemented method of displaying a hypertext document on a computer display, the hypertext document including an internal hypertext link definition linked to a predetermined location in the hypertext document, the method comprising:
(a) determining that the internal hypertext link definition is for an internal hypertext link;
(b) determining a position of the predetermined location in the hypertext document; and
(c) displaying the hypertext document and the internal hypertext link definition on the computer display, including, in response to determining that the internal hypertext link definition is for an internal hypertext link and determining the position, indicating in association with the internal hypertext link the internal status of the internal hypertext link definition, the internal status additionally indicating the position of the predetermined location on the computer display.

39. The method of claim 38, wherein the position is a relative position from the internal hypertext link definition to the predetermined location in the hypertext document.

40. The method of claim 38, wherein the position is an absolute position of the predetermined location in the hypertext document.

41. The method of claim 40, wherein indicating the position includes displaying the internal hypertext link definition in first and second colors such that a boundary between the first and second colors indicates the position of the predetermined location.

42. The method of claim 40, wherein indicating the position includes:
(a) displaying a graphical depiction of the hypertext document; and
(b) displaying on the graphical depiction a link extending from an absolute position of the internal hypertext link definition in the graphical depiction to an absolute position of the predetermined location in the graphical depiction.

43. The method of claim 42, wherein displaying the graphical depiction of the hypertext document includes displaying the graphical depiction in a separate container from the hypertext document.

44. The method of claim 43, wherein the separate container is a pop-up window.

45. The method of claim 43, wherein the separate container is a panel.

46. The method of claim 40, wherein indicating the position includes displaying a numeric position indicator.

47. The method of claim 38, further comprising displaying an arrow icon on the computer display that indicates a direction from the internal hypertext link definition to the predetermined location, wherein indicating the position includes controlling a display characteristic of the arrow icon to indicate the position, the display characteristic selected from the group consisting of color, size, and combinations thereof.

48. The method of claim 38, further comprising displaying at least a portion of the hypertext document in a window, the window including a scroll bar, wherein indicating the position includes displaying an indicator on the scroll bar.

49. The method of claim 38, further comprising indicating the position only in response to user input placing focus on the internal hypertext link definition.

50. A computer system configured to display a hypertext document, the hypertext document including an internal hypertext link definition linked to a predetermined location in the hypertext document, the computer system comprising:
(a) a computer display, and
(b) a processor, coupled to the computer display, the processor configured to display the hypertext document and the internal hypertext link definition; and, in response to determining that the internal hypertext link definition is for an internal hypertext link and determining a position of the predetermined location in the hypertext document, to indicate in association with the internal hypertext link definition an internal status of the internal hypertext link definition, the internal status additionally indicating the position of the predetermined location in the hypertext document.

51. The computer system of claim 50, wherein the position is a relative position from the internal hypertext link definition to the predetermined location in the hypertext document.

52. The computer system of claim 50, wherein the position is an absolute position of the predetermined location in the hypertext document.

53. The computer system of claim 52, wherein the processor is configured to indicate the position by displaying the internal hypertext link definition in first and second colors such that a boundary between the first and second colors indicates the position of the predetermined location.

54. The computer system of claim 52, wherein the processor is configured to indicate the position by:

(a) displaying a graphical depiction of the hypertext document; and (b) displaying on the graphical depiction a link extending from an absolute position of the internal hypertext link definition in the graphical depiction to an absolute position of the predetermined location in the graphical depiction.

55. The computer system of claim 52, wherein the processor is configured to indicate the position by displaying a numeric position indicator.

56. The computer system of claim 50, wherein the processor is configured to display an arrow icon on the computer display that indicates a direction from the internal hypertext link definition to the predetermined location, and wherein the processor is configured to indicate the position by controlling a display characteristic of the arrow icon to indicate the position, the display characteristic selected from the group consisting of color, size, and combinations thereof.

57. The computer system of claim 50, wherein the processor is configured to display at least a portion of the hypertext document in a window, the window including a scroll bar, and wherein the processor is configured to indicate the position by displaying an indicator on the scroll bar.

58. A program product, comprising:

(a) a program configured to perform a method of displaying a hypertext document on a computer display, the hypertext document including an internal hypertext link definition linked to a predetermined location in the hypertext document, the method comprising:

(1) determining a position of the predetermined location in the hypertext document; and (2) displaying the hypertext document and the internal hypertext link definition on the computer display, including, in response to determining that the internal hypertext link definition is for an internal hypertext link and determining the position, indicating in association with the internal hypertext link the internal status of the internal hypertext link definition, the internal status additionally indicating the position of the predetermined location on the computer display, and (b) a signal bearing media bearing the program.

59. A computer-implemented method of displaying a hypertext document on a computer display, the hypertext document including an internal hypertext link definition linked to a predetermined location in the hypertext document, the method comprising:

(a) determining that the internal hypertext link definition is for an internal hypertext link;

(b) determining a position of the predetermined location in the hypertext document;

(c) displaying a window on the computer display, the window displaying at least a portion of the hypertext document, and the window including a scroll bar configured to display selected portions of the hypertext document in the window in response to user input, the scroll bar including a slider; and (d) in response to determining that the internal hypertext link definition is for an internal hypertext link and determining the position, indicating on the scroll bar, and other than with the slider, the internal status of the internal hypertext link definition, the internal status additionally indicating the position of the predetermined location in the hypertext document.

60. The method of claim 59, wherein indicating the position includes displaying an indicator at a position on the scroll bar that corresponds to the absolute position of the predetermined location in the hypertext document.

61. The method of claim 60, wherein the indicator includes a horizontal line.

62. The method of claim 59, further comprising indicating the position only in response to user input placing focus on the internal hypertext link definition.

63. A computer system configured to display a hypertext document, the hypertext document including an internal hypertext link definition linked to a predetermined location in the hypertext document, the computer system comprising:

(a) a computer display; and (b) a processor, coupled to the computer display, the processor configured to determine that the internal hypertext link definition is for an internal hypertext link, to determine a position of the predetermined location in the hypertext document, to display at least a portion of the hypertext document in a window, and, in response to determining that the internal hypertext link definition is for an internal hypertext link and determining the position, to indicate on a scroll bar for the window, and other than with a slider on the scroll bar, the internal status of the internal hypertext link definition, the internal status additionally indicating the position of the predetermined location in the hypertext document.

64. The computer system of claim 63, wherein the processor is configured to display an indicator at a position on the scroll bar that corresponds to the absolute position of the predetermined location in the hypertext document.

65. The computer system of claim 64, wherein the indicator includes a horizontal line.

66. The computer system of claim 63, wherein the processor indicates the position only in response to user input placing focus on the internal hypertext link definition.

67. A program product, comprising:

(a) a program configured to perform a method of displaying a hypertext document on a computer display, the hypertext document including an internal hypertext link definition linked to a predetermined location in the hypertext document, the method comprising:

(1) determining that the internal hypertext link definition is for an internal hypertext link;

(2) determining a position of the predetermined location in the hypertext document;

(3) displaying a window on the computer display, the window displaying at least a portion of the hypertext document, and the window including a scroll bar configured to display selected portions of the hypertext document in the window in response to user input, the scroll bar including a slider; and (4) in response to determining that the internal hypertext link definition is for an internal hypertext link and determining the position, indicating on the scroll bar, and other than with the slider, the internal status of the internal hypertext link definition, the internal status additionally indicating the position of the predetermined location in the hypertext document; and (b) a signal bearing media bearing the program.

\* \* \* \* \*